Aug. 10, 1937.  E. A. HAGY  2,089,604
APPARATUS FOR TESTING CONCRETE MIXTURES FOR CONSISTENCY
Filed Nov. 17, 1932  5 Sheets-Sheet 1

Ernest A. Hagy
INVENTOR
and
Murray Zugelter
BY
ATTORNEYS.

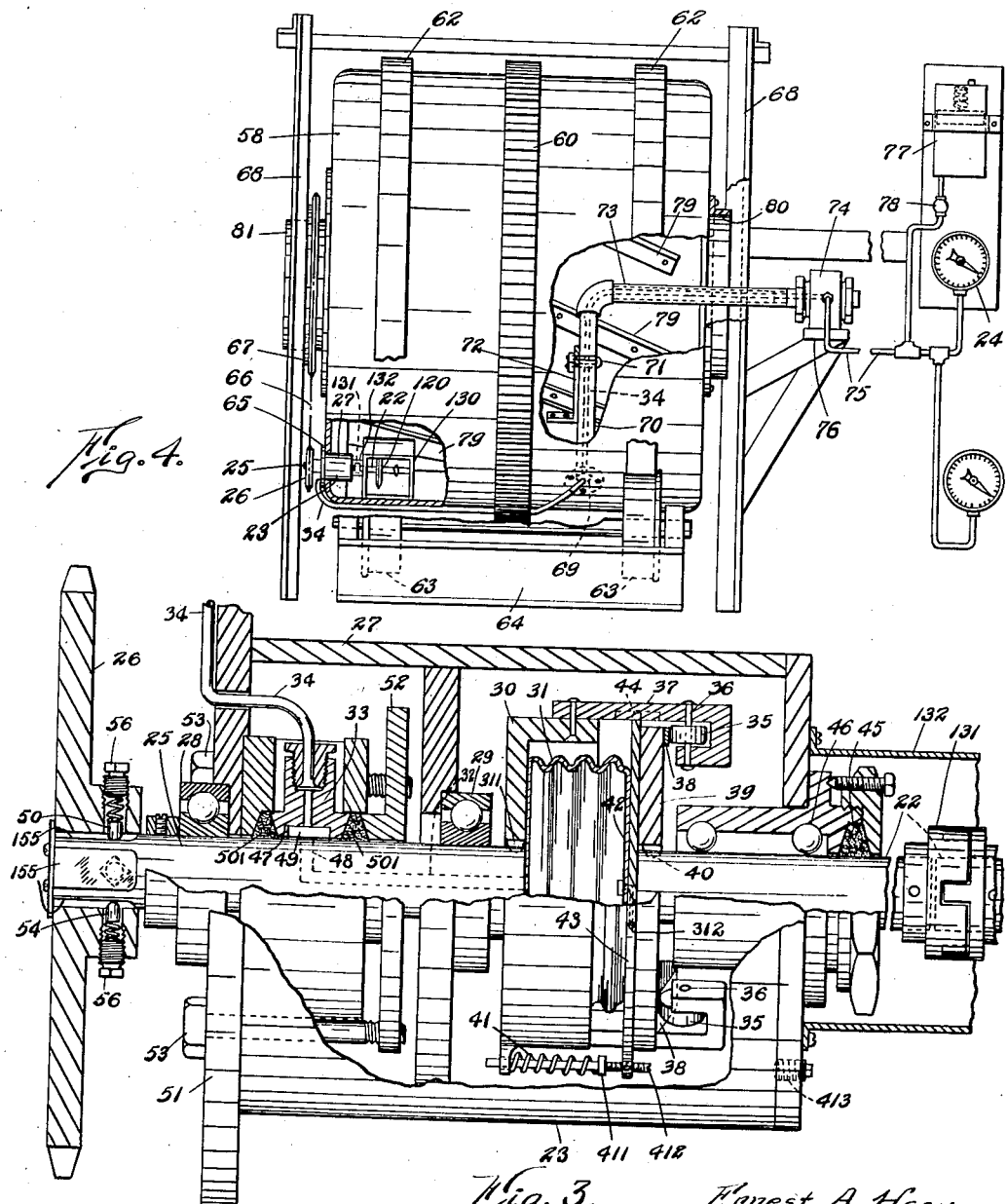

Aug. 10, 1937.  E. A. HAGY  2,089,604
APPARATUS FOR TESTING CONCRETE MIXTURES FOR CONSISTENCY
Filed Nov. 17, 1932  5 Sheets-Sheet 3

Ernest A. Hagy
INVENTOR
BY Murray and Zugelter
ATTORNEYS.

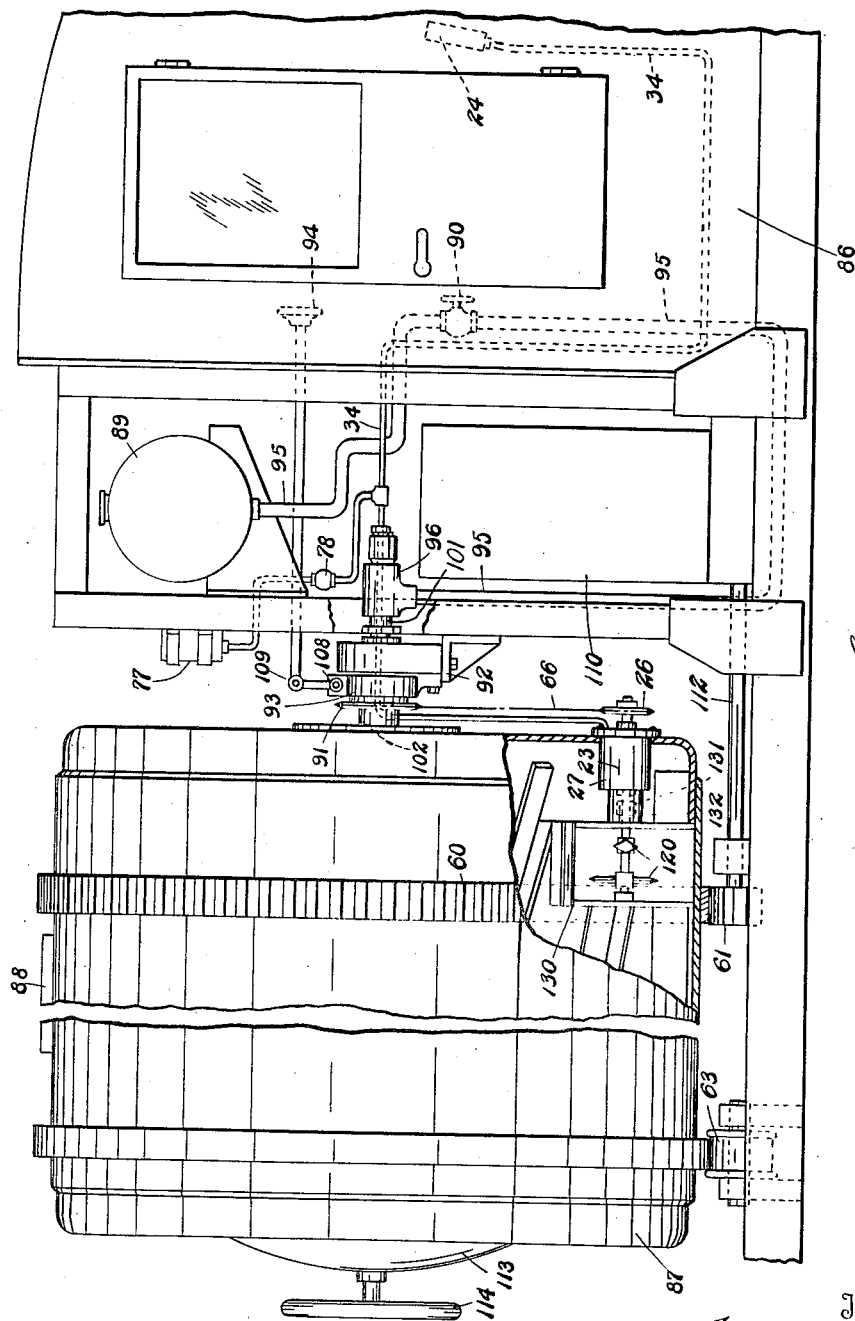

Aug. 10, 1937.   E. A. HAGY   2,089,604
APPARATUS FOR TESTING CONCRETE MIXTURES FOR CONSISTENCY
Filed Nov. 17, 1932   5 Sheets-Sheet 5
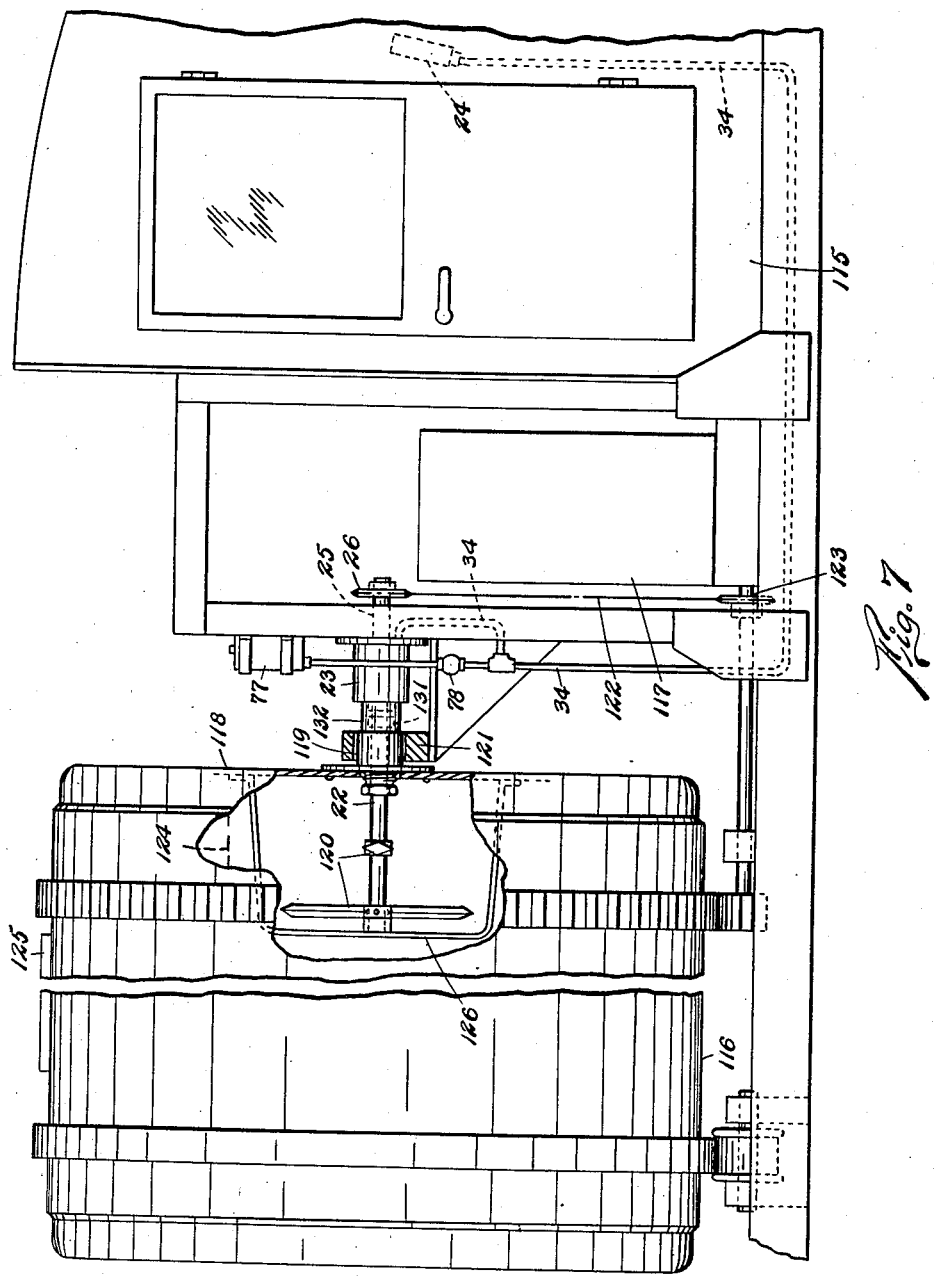
Inventor
Ernest A. Hagy
By Murray and Zugelter
Attorneys.

Patented Aug. 10, 1937

2,089,604

UNITED STATES PATENT OFFICE 2,089,604

APPARATUS FOR TESTING CONCRETE MIXTURES FOR CONSISTENCY

Ernest A. Hagy, Cincinnati, Ohio

Application November 17, 1932, Serial No. 643,028

21 Claims. (Cl. 83—73)

This invention relates to a method and apparatus for insuring the reproduction in the field or on the job of plastic semi-solid substances such as concrete or other cement-containing mixes designed in the laboratory or elsewhere by calculation or other methods, and the duplication in the field or on the job of successive batches so designed.

Objects of the invention are: (1) To provide accurate and dependable means for insuring the reproduction, in quantity, of concrete or other cement-containing mixes, of any pre-determined specific design, thus eliminating guess-work and approximations on the part of the supervisor who controls the concrete and mixing operations and attempts to duplicate successive batches which will be prototypes of said pre-determined design; (2) to provide a novel method of reproduction, in the field or on the job, of any concrete designed in the laboratory or elsewhere to meet requirements of a given job; (3) to provide simple and inexpensive, yet accurate and dependable means for duplicating concrete or other cement-containing mixes; (4) to effect greater economies in the construction of concrete roads, bridges, buildings, and other structures constituted of concrete, wholly or in part, due to the assurance of reliable duplication which permits a reduction in costly cement requirements that heretofore were kept necessarily high in order to be assured of a concrete which, notwithstanding the wide variation in strengths known from past experience to exist because of the inability to duplicate successive batches, would still have a minimum strength sufficient to satisfy design requirements; (5) to permit a decreased factor of safety in concrete design (heretofore kept high in comparison with corresponding factors for other structural materials, due to the inaccuracies and uncertainties in concrete production which do not occur to such a degree in the manufacture or production of these other materials) which permits the use of higher working stresses with a corresponding decrease in material requirements and an increase in valuable floor space and headroom; (6) to effect greater speed and economy in construction and to insure a more durable and uniform finished structure through the maintenance of a constant workability or consistency, which will eliminate costly delays in placing and subsequent pointing-up of honeycombing and voids, both due to variations in said workability or consistency; (7) to permit the safe use of higher working stresses, than is present day practice.

The foregoing and other objects are attained by the means described herein and disclosed in the accompanying drawings, in which:

Fig. 3 is a view, partly in cross-section showing a device forming part of the invention, wherein torque is translated into fluid pressure which operates a suitable pressure gauge.

Fig. 4 is a side elevational view of a concrete mixer embodying the invention.

Fig. 6 is a fragmental side elevational view showing the invention as applied to a vehicle or a transit mixer.

Fig. 7 is a view similar to Fig. 6 showing the invention as applied to a type of concrete conveyor or vehicle, wherein the drum or container is intended to have merely a slight agitating action upon the contents of the drum.

Figure 1:
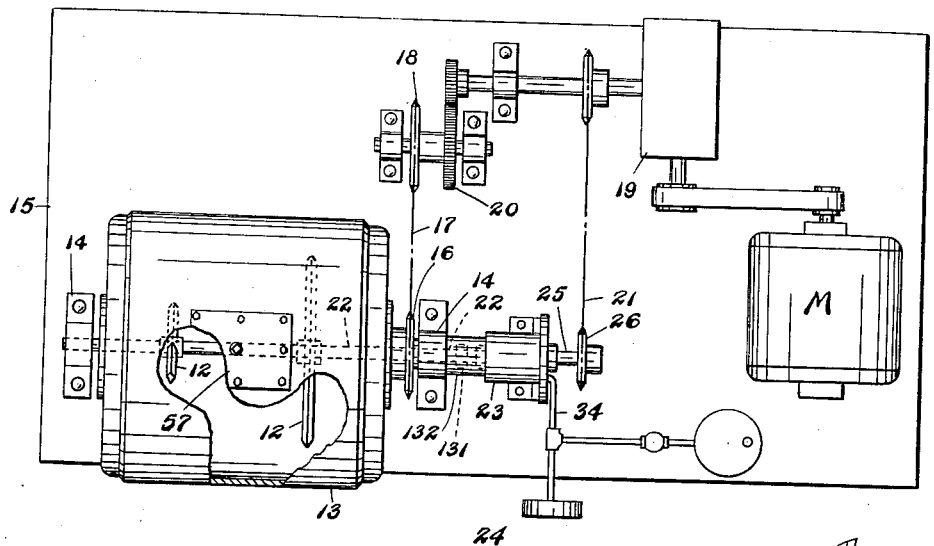
Fig. 1 is a plan view of a mechanical device whereby the wetness or stiffness of a given or pre-determined plastic mass is indicated.

A proper understanding of this invention may be facilitated by first stating certain facts and noting the prevailing difficulties which have in the past rendered results so uncertain in concrete construction. Two prime factors in the control of concrete are strength and consistency (the term consistency being generally employed by the concrete industry to denote comparative wetness or stiffness), and too much stress cannot be placed on the importance of maintaining their uniformity. For instance, the factor of safety (the ratio of ultimate strength to working stress) for any concrete structure may seem unnecessarily high or conservative when based on the average of test results for the entire job, but it is known that under present day methods of control there will be certain sections within the structure where the concrete strength is considerably below the average, and the factor of safety in these sections will be correspondingly low. The designer, then, must base his working stresses upon such probable minimum values, and not upon the average strengths. If this range or variation in concrete strengths throughout the structure can be materially reduced, the design factor of safety may be justifiably decreased, with resulting economies in concrete construction. During actual construction operations, the maintenance of a constant consistency is instrumental in reducing placing costs and contributes directly to the life and effectiveness of the structure. Batches drier than the desired consistency affect the speed of placing and cause honeycombing and voids in the finished structure, which tend to reduce strength and durability. Over-wet batches have a tendency to segregate, resulting again in reduced strength—the reduction in strength being due not only to segregation but to increased water content as well.

Controlling the uniformity of batches would be easy if it were possible to introduce the same amount of cement, aggregates and water into each and every batch (these being the usual constituents of concrete). Cement can be measured by weight, to a degree of accuracy which is entirely satisfactory. Aggregates also can be measured with equal accuracy, except that the amount of water carried by the damp aggregates, if unknown (and it usually is unknown), involves a small error in the quantity of aggregates. This error in the quantity of aggregates is negligible, however, in comparison with the error thus introduced into the water content of the mixture—an error some ten times as great as the error in quantity of aggregates—and it is an error in that ingredient (water) which has the greatest effect on strength and consistency. Water which is introduced into the batch at the mixer can be measured with a suitable degree of accuracy, but the strength and consistency of the concrete depend upon the total water in the batch, i. e., the sum of the water added and that introduced with the aggregates. This latter is a constantly changing unknown quantity, and is the chief cause for variation of strength and consistency. While this unknown quantity of water usually is not ignored in the control of concrete, it is extremely difficult and ofttimes impossible under job conditions to measure accurately the amount of such water where a rapid variation in moisture content may occur in the stockpile or under changing weather conditions.

From the above explanation it should be clear that if some method were devised for maintaining a constant consistency, the cement and aggregates remaining constant also, it would necessarily follow that the control of the total water, and the strength as well, would be automatically attained. To date several different methods, all rather crude, have come into general use, but none of these has effectively solved the problem. They may be divided into two classes: visual and semi-mechanical, both susceptible to error of the human element. In attempting to control consistency by visual inspection, the mixer operator or another person judges the wetness or dryness of the batch while in the mixer and makes whatever adjustments seem necessary. Such a method is only approximate at best. Another scheme involves inspection of the freshly mixed concrete after it has been discharged from the mixer, with adjustments being made on succeeding batches, but with no opportunity to correct the discharged batch. This is true of transit mixers, or of any mixer where the concrete is mixed in an entirely closed container, and is a very unsatisfactory method at any time. The so-called "slump" and "flow" tests provide a semi-mechanical means for measuring the consistency, but these tests also are very susceptible to error of the human element in their execution, and are of low sensitivity. Furthermore, they must be made after the completion of the mixing operation in most cases, and the concrete ultimately may prove either to be stiffer or wetter than the desired consistency, due either to error in the quantity of water used, or to uncontrolled moisture content of the aggregate. Evidently, then, no reliable method of controlling the consistency of concrete while in the process of mixing has been devised heretofore, notwithstanding the fact that such a method has long been needed, and in fact, has long been sought.

One of the objects of my invention is to overcome the difficulties just mentioned by providing an accurate means of measuring the consistency of concrete or other cement containing mixes, thus insuring the reliable duplication of any desired consistency. As previously stated, uniformity of consistency results also in uniformity of strength, both of which contribute directly to economic savings. In order to clearly understand how the duplication and maintenance of a certain consistency will provide a uniform strength, and to show that the invention provides for the reproduction of any specific design, I will give my conception of a typical concrete batch, and the application of the invention thereto. The basic constituents of such a concrete are the aggregates, the cement, and the water. The cement and water when combined form a paste. It is the function of this paste, when combined with the aggregate, to transform the whole into a mobile, plastic mass. Once the concrete is in place, the function of the paste changes and it becomes the binding medium, which again transforms the mass from a plastic to a solid material which has a certain strength that is dependent upon the cement-water ratio, or proportion of cement to water, or even more simply, the concentration of the paste.

In any combination of aggregate particles of varying sizes there are inter-particle spaces commonly termed "voids", the relative amount of which will depend upon the gradation of the aggregates and the shapes of the individual particles. In a plastic concrete mass it is necessary to provide sufficient paste to fill the voids in the aggregate, plus a certain excess of paste to separate the particles and to act as a lubricant. The degree of lubrication, which is the consistency of the mass is dependent upon the amount of this excess paste, and to a certain extent upon the relative mobility of the paste itself, which is in turn governed by the cement-water ratio. In some instances, other materials, classed as admixtures, are included in the concrete mix, and effect the lubrication to some extent. They do not, however, change the basic considerations of a typical concrete as stated above.

The function of the invention is to measure and control the amount of excess paste, a small excess corresponding to a relatively low or "stiff" consistency, and a large excess providing a higher degree of lubrication or a "wet" consistency. Concrete may be designed for any specific consistency and strength in the laboratory or elsewhere, and the amount of the excess paste may be measured and controlled by the apparatus of this invention. Now, it is possible to reproduce and duplicate the designed concrete on any job and at any time if the same cement and aggregates are used in the same proportionate amounts, and water is added to the whole until the consistency, or excess paste, as measured and controlled by the means provided by this invention, coincides with that of the original design. From the preceding discussion it is evident that this process leads not only to the maintenance of a constant excess paste quantity, but to constant total paste quantity if the voids in the aggregate have remained unchanged. Now the total volume of this paste is dependent upon the volume of the cement plus the volume of the water. Since the volume of the cement can be accurately maintained, it follows that the same quantity of water will be present each time. Consequently the ratio of cement to water, which governs the strength, will be also automatically maintained as a constant.

Obviously a change in gradation or type of aggregate will affect the paste requirements and it is therefore necessary to maintain the original gradation and type, or to redesign to meet the changed conditions. In practice any one of several known expedients may be employed to maintain a sufficiently constant grading, and it is seldom that the type of aggregate undergoes a change in the course of a single job.

In those instances wherein it is desired to use laboratory methods, laboratory trials first are performed for the purpose of determining the exact amounts of sand, gravel, cement, and water required to produce a laboratory batch of concrete of a designed strength and consistency. In performing these laboratory trials, I first calculate the voidage, surface area, and free water content of the aggregate, and, taking into consideration the amount of free water in the aggregate, I add to the known quantity of cement an amount of water which, with the free water of the aggregate, will result in the quantity of cement paste sufficient to fill the voids and provide a certain excess necessary for the desired consistency, and also to attain a cement-water ratio that results in a concrete of a given strength. After completion of the laboratory batch of concrete, the batch is placed in a laboratory device, (Figs. 1, 2 and 3) which indicates the amount of resistance offered by the plastic mix to the shearing action of one or more blades which are power driven through the plastic mass. A notation is made of the gauge reading. Then, to reproduce said laboratory batch in quantities, on the job, the large mixers are supplied with sand, gravel, and cement in the same proportions as were used in the laboratory mix, together with a quantity of water insufficient to impart the desired stiffness to the mass. During the mixing of the constituents just mentioned, water is slowly added until a gauge or indicator connected to a device in the mixer, similar to the laboratory device, indicates a shearing resistance identical with that which was indicated by the gauge of the laboratory device. It will be found, then, that concrete made on the job will be identical in consistency, workability, plasticity and strength with the concrete of the laboratory batch. This manner of duplicating the mixes automatically and with certainty takes care of the varying conditions of moisture in the aggregate. As is stated in a previous paragraph, the method above disclosed is extremely advantageous on transit mixers, or any closed mixers in which inspection of the batch during mixing is impossible.

The improved method of the invention having been set forth in detail above, the remainder of the specification will be devoted to a description and explanation of the apparatus employed to practice the method. The apparatus about to be described is capable of considerable modification, depending upon the nature and amount of plastic substance to be produced, the construction and size of the existing concrete producing equipment, and the conditions under which the equipment is operated; and all such changes and modifications are to be understood as included in the invention provided that they fall within the scope of the appended claims.

Figure 2:
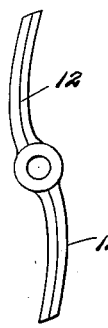
Fig. 2 is an elevational view of a shearing element.

Reference is first made to Figs. 1, 2 and 3, which exemplify a type of test or laboratory device for use in determining the shearing resistance of the test batch to the rotational movement of the blades or shearing elements 12 that are power driven through the test batch contained within a receptacle or drum 13. Preferably, though not necessarily, the drum 13 is power actuated to rotate in a direction counter to the direction of rotation of the elements 12. By thus rotating the drum and shearing elements in opposite directions, the tendency toward segregation of the test batch is substantially eliminated.

The drum 13 may conveniently be rotatably mounted between bearing standards 14 secured to a base 15, and at one end of the drum may be fixed a sprocket 16 which, by means of a chain 17, is driven from a second sprocket 18. In order to secure a slow speed drive for the drum, there is interposed between the motor M and the sprocket 18 any suitable type of reduction gearing which may be indicated generally by the characters 19 and 20. A second power transmission means, which may be a chain and sprocket arrangement 21, serves to rotate, indirectly, the shaft 22 upon which are fixedly mounted the blade or shear members 12. The resistance of the plastic batch in the drum, to the rotational movement of the shear elements 12, is determined by means of an apparatus 23 wherein a fluid pressure, which is a measure of the shearing resistance, is built up and translated into a reading on any suitable type of pressure gauge 24. The apparatus 23 is more clearly illustrated in Fig. 3, and the gauge arrangement is identical with that of Fig. 4, which will be described later.

Referring now to Fig. 3, there are shown shafts 22 and 25 of Fig. 1 extending from opposite ends of the device 23, the sprocket 26 being carried by the shaft 25 and mounted thereon in such a manner as to normally rotate therewith. The sprocket may be keyed or otherwise fixed to the shaft, as desired. The shaft enters one end of the housing 27, where it is mounted upon suitable bearings 28 and 29. The innermost end of the shaft carries a small housing 30 of cylindrical or other shape, to which it is keyed or otherwise secured against relative rotation, as at 311. Interiorly of the housing 30 is disposed the yielding fluid-containing receptacle 31, which may be of either the usual diaphragm type or the bellows type shown. The interior of the yielding container has communication with the bore 32 of shaft 25, and said bore is in turn placed in communication with a collecting ring structure 33 whereby the gauge pipe 34 may convey fluid pressure to the gauge for indicating the pressure exerted upon the yielding container by the resistance of the plastic to rotation of the shearing blades.

The yielding container may be flexed by the action of one or more wedging devices, each of which may be constituted of a roller 35 whose axle 36 is mounted upon a part 37 which is fixed relative to the inner casing 30. Each roller is adapted to ride upon an inclined surface or tapered lug 38 which is fixed to, or formed integrally with, a compression plate or element 39 that is keyed or otherwise fixed upon the inner end of shaft 22, as at 40. Thus, upon relative rotational movement of the shafts 22 and 25 in a proper direction, the rollers may ascend the inclines whereby to move the plate member 39 toward the yielding container, so as to apply a force thereto and cause the fluid contained therein to flow through the fluid passages 32 and 34 to the pressure gauge. Two or more adjustable springs or the like 41 may be employed to return the yielding container walls to the normal extended position. In order to reduce the wear upon the bellows wall 42 a suitable plate or sheet 43 may be interposed between the members 39 and 42. Said plate or sheet preferably has a spline connection with the bellows casing, as at 44, so as to preclude rotation of the plate relative to the bellows wall while permitting free reciprocatory movement thereof. The shaft 22 passes through a suitable packing structure 45 and rotates within the anti-friction bearing 46. It is desirable to reduce to a minimum the friction upon shaft 22 and other moving parts of the device which cooperate to actuate the bellows. The position of abutment 411 may be adjusted to vary the forces of the spring 41 by application of a screw driver or other tool to the head end 412 of the spring support rod. Access to the head may be had through a normally plugged opening 413 of the housing. This adjustment may be used for correlating a plurality of gauges, or for correcting errors in the readings due to structural differences in the fluid pressure system.

The fluid collecting structure 33 may be of any approved type, there being shown however a block 47 having a circular bore for snugly receiving the shaft 25 in the region of the port 48. The annular recess 49 of the block communicates at all times with said port so that there may be afforded an uninterrupted communicating passage between the gauge pipe 34 and the interior of the yielding fluid container 31. At each side of the block 47 is a ring 501 of packing material, which may periodically be compressed between the flange plate 51 and an adjustable gland member 52 by tightening the screws 53 which threadedly engage screw threads in the member 52, as shown.

As was stated before, the sprocket or driving wheel 26 may be fixed directly onto the shaft 25, but in order to preclude injury to the parts due to possible binding of oversized particles or objects in the drum 13, said driving wheel and shaft may be provided with any suitable safety or slipping clutch. As exemplified herein, the safety clutch comprises a series of spring urged plungers 54 having rounded inner ends which normally abut the flats 55 of the squared end of the shaft. When the turning force of the driving wheel exceeds an amount determined by the force of the plunger springs, the plungers slip over the corners of the squared end of the shaft whereby to relieve the strain on the parts. The compressive force of each spring is determined by the screw 56 which is threaded into a transverse bore of the sprocket or driving wheel hub.

Referring again to Fig. 1, it should be understood that the drum may be filled or partly filled, through an opening covered by the removable plate 57, with a test batch of concrete or plastic substance proposed for reproduction on the job. Then the motor is operated for rotating the drum and the shearing elements in opposite directions at a speed comparable to that employed in field applications of the device. The resistance of the concrete or plastic substance to rotation of the shearing elements causes such relative disposition of the shafts 22 and 25 as will effect a climbing of the rollers 35 upon the inclines 38, whereby to compress the yielding container 31 and the fluid therein. The amount of compression is indicated on the gauge 24, and a notation is made of the reading.

Now, to reproduce or duplicate the test batch on the job or in the field, the mixing drum 58 of Fig. 4 is charged with amounts of cement, sand, and gravel, proportionate to the amounts thereof used in the test batch, these ingredients being mixed with an amount of water insufficient to impart the desired wetness to the batch. It is to be observed that the mixing apparatus of Fig. 4, like the laboratory device of Fig. 1, is equipped with the shearing elements 120 working in a receptacle 130, these being associated with a resistance indicating mechanism identical with that of Figs. 1 and 3. Inasmuch as the indicating mechanism is substantially identical in all views, the parts thereof will bear common reference characters.

Figure 5:
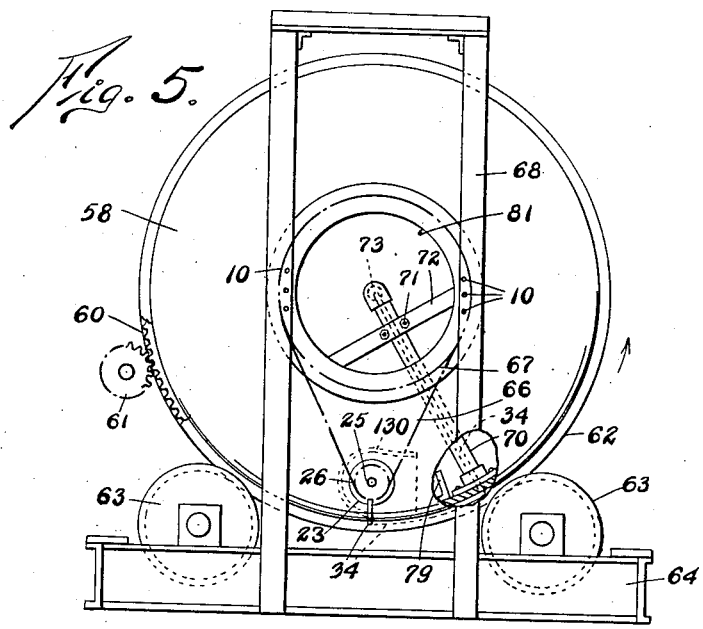
Fig. 5 is an end view of the device of Fig. 4.

The mixing apparatus of Figs. 4 and 5 may be either stationary or mounted upon a vehicle, and the drum 58 thereof may be driven by any suitable means. As disclosed herein, the drum carries on its periphery a gear 60 which meshes with a driving pinion 61 that may be power rotated by a motor, engine, or the like (not shown). The drum carries suitable tracks or rails 62 whereby the drum rides upon the flanged trunnions 63 during rotation of the drum. The trunnions are supported for rotation in a suitable frame structure 64.

The receptacle 130 is fixed to an inner wall of the drum in such a position as to be capable of receiving a charge of concrete from the mass upon each rotation of the drum as indicated by the arrow in Fig. 5. Upon each rotation of the drum, the receptacle moves through the mass and carries a portion of it upwardly, during which period the shearing elements operate thereon to give a gauge reading. As is evident, the receptacle will discharge as it approaches the highest elevation in the drum, and from that point until the receptacle again enters the mass, no gauge reading will result because the receptacle will be empty. The device 23 is bolted or otherwise secured to the drum wall at the location 65, and its shaft 25 extends through the wall to the exterior, where the sprocket 26 is mounted thereon in the manner disclosed in Fig. 3.

It is to be observed that shaft 22 has a limited longitudinal movement in addition to the rotational movement imparted thereto by shaft 25. Said longitudinal movement results from the action of the inclined planes 38. In order that the blades 12 may rotate always in a plane and be uninfluenced by the limited longitudinal movement of shaft 22, said shaft in each instance is provided with any known type of flexible coupling which will permit limited elongation of the shaft. One simple type of coupling is indicated at 131 in Fig. 3. The character 132 indicates any suitable form of shield or guard which protects the coupling from entry of foreign substances.

The sprocket 26 (Fig. 4), though it may be driven from any suitable source of power, is shown herein as being driven by a chain 66 which passes over said sprocket and a second sprocket 67. This second sprocket may be stationary, and it preferably is fixedly mounted upon any suitable support, for example, a part of the existing frame 68. The fluid pipe 34 leading from the device 23 to the gauge 24 may be disposed exteriorly of the drum, as shown, and at a point 69 it may reenter the drum through a hollow protective tube 70 which is braced within the drum by any suitable means such as a U-bolt 71 or the like which clamps the tube to a strut or brace 72 fixed within the drum. The tube has a horizontal section 73 that coincides with the axis of the drum and carries the indicator fluid to any approved type of collecting ring structure 74, whence the fluid is conveyed, through the pipe 75, to the gauge 24. The collecting ring structure 74 may be mounted upon a stationary support 76. The character 77 indicates a fluid reservoir which, through the agency of a pipe including a check valve 78, replenishes the fluid of line 75 in the event of fluid leakage in the system. The location of the pressure gauge 24 will depend upon the location of the operator's station or the place where the readings are to be observed or recorded, and as illustrated in Fig. 4, the system may include a plurality of gauges placed at various locations.

The character 79 indicates the blades or agitating elements of the mixer drum 58, and at 80 and 81 are indicated the receiving and discharging ports of the drum. The mechanisms for charging the drum and effecting discharge of the contents are not illustrated, as they form no essential part of the invention.

It will be understood from the foregoing, that after the mixer drum 58 has been charged with the same proportion of cement and aggregate as was employed in the test batch, together with a quantity of water less than that required to impart the desired consistency or wetness to the mix, water may be added in small quantities during the mixing operation until the shearing resistance of the concrete in the mixer, as indicated by the gauge 24 thereof, corresponds to the shearing resistance as obtained from the test batch. The concrete thus produced on the job will be of the same wetness or consistency, workability and plasticity as that of the test batch, and furthermore it will have the same strength. Obviously, successive batches showing the same gauge reading, will be equivalent in strength and wetness. Thus, the gauge reading determines the duration of the mixing action, and when the concrete leaves the mixer drum 58, it is known to be of the desired consistency and strength; and it may again be stated that neither the semi-mechanical slump and flow tests nor the crude method of visual inspection can control these properties to an equivalent degree of precision.

Fig. 6 illustrates a vehicle 86, which may be a motor truck, upon which is mounted a mixer drum 87. The elements 120, 130, 23, 26, 66, 60, 61 and 63 are the same as those shown in Figs. 4 and 5. The drum may or may not be equipped with interior blades or agitators. Now, in this type of device, the drum may be charged, through the closable port 88, with the proper amounts of cement and aggregate, as determined by the test batch, together with an amount of water insufficient to impart the desired or required wetness to the mix. However, after closing the opening 88 and applying power to the driving pinion 61, the driver of the truck is enabled to progressively add water, from tank 89, to the contents of the drum and to simultaneously observe the reading of the pressure gauge 24, which, in this instance, is shown located within the cab of the truck. At 90 is indicated the valve for controlling entry of water into the drum. By means of this arrangement, the concrete will be of the required wetness or consistency by the time the truck reaches the job, and the superintendent or inspector on the job may make his own observation of the gauge reading.

The application of the invention is particularly advantageous in this case, wherein the concrete is mixed in a closed receptacle or drum, because it is impossible to observe or determine the character of the mixture until it is discharged from the mixer drum. After discharge of the mixture it is of course too late to make any adjustment in this particular batch, wherefore it must either be rejected or used as delivered.

Figure 8:
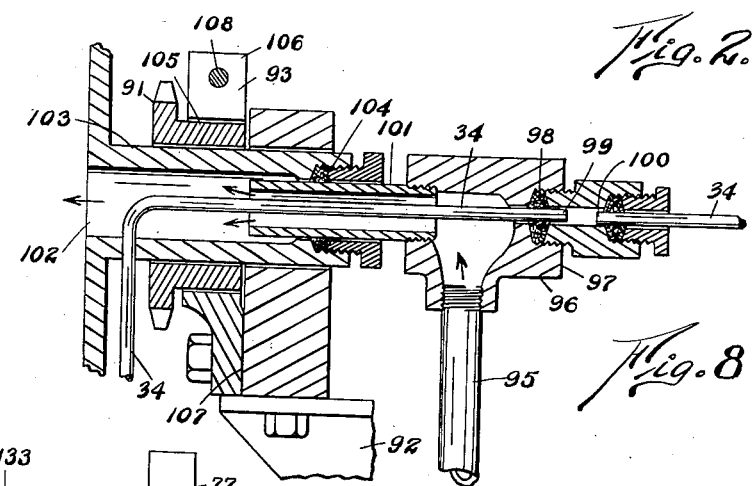
Fig. 8 is an enlarged cross-sectional detail view of a piping arrangement shown conventionally in Fig. 6.

To proceed with the description of Fig. 6 it may be stated that chain 66 is driven by means of a sprocket 91 which may be locked to assume a fixed position relative to the support 92, so that said sprocket may function in the same manner as sprocket 67 in Figs. 4 and 5. Locking and unlocking of the sprocket may be accomplished through the agency of any suitable type of manually or power actuated clutch 93, the control means 94 of which extends into the cab of the truck. The clutch may be of any suitable construction, and for purposes of simplification in description, there is shown in Figs. 6 and 8 a conventional clutch means that may be operated manually. The provision of the clutch makes it possible for the operator to render operative or inoperative, at will, the shearing resistance indicator apparatus.

Although water from the tank 89 may be led to the mixing or agitating drum in various ways, there is disclosed herein the water pipe 95 through which the flow may be controlled by the valve 90, said pipe being led to a form of T-fitting 96 which is detailed in Fig. 8. As is clearly indicated in Fig. 8, the fitting is provided at one end 97 with a packing means 98 through which may extend the rotating and stationary parts 99 and 100, respectively, of the fluid pressure line 34. Water from the pipe 95 enters the T-fitting and is conveyed through the hollow pipe section 101, to the discharge port 102 which empties into the interior of the mixing drum. The section 101 is extended into the interior of the hollow drum support 103, and may have rotation relative thereto through the provision of a packing joint 104. Thus it will be clear that the pipe 34, hub 103 and packing joint 104 may rotate with the drum, while the pipe 95 and the fitting 96, together with the stationary pipe section 100, remains stationary.

Referring now more specifically to the simple form of clutch disclosed in Fig. 8, it will be observed that the hub 105 of sprocket 91 loosely fits the hub 103, the exterior of hub 105 being capable of fixation relative to the bracket 92 by contraction of a resilient band 106 which encircles hub 105. The band is fixed to the bracket at 107, and may be expanded and contracted by means of a screw 108 to which the lever arrangement 109 (Fig. 6) is applied. The lever arrangement is shown as being manually actuated by the handle means 94. As is clearly indicated, the fluid pressure pipe is provided with the usual reservoir 77 and check valve arrangement 78, to compensate for fluid leakage in the system. The rectangular box 110 houses a suitable motor (not shown) which imparts rotational movement to the shaft 112 that carries the driving pinion 61.

At the rear end of the mixing drum is shown, conventionally, a discharge door 113 which may be opened by the actuation of a suitable hand wheel or the like 114. The door 113 closes an opening at the rear of the drum, and has been used extensively in transit mixers generally.

In the foregoing paragraphs the device of the invention has been described, and in Fig. 6 it is shown as being applied to a truck-mounted drum having blades for mixing the concrete. It should be understood, however, that the device is applicable, in the manner of Fig. 6, to truck-mounted drums with or without blades, used to convey and/or agitate a batch of concrete which has been wholly or partly mixed before being poured into the drum.

Reference is now made to Fig. 7 wherein is shown a motor vehicle 115 similar to that of Fig. 6 in that it carries concrete conveying drum 116 supported and driven in the usual manner. Any suitable motive means for the drum is indicated at 117. In this modification, the front wall 118 of the drum has extending therefrom, at the drum axis, a stud shaft 119 which is supported in a suitable bearing 121. The stud shaft is made hollow to receive the shaft 22 which carries the shearing elements 120. As is clearly indicated, said shaft 22 extends into the device 23 (see Fig. 3), and the shaft 25 of said device carries the usual sprocket 26 which is mounted upon the shaft in the manner illustrated in Fig. 3. The sprocket 26 is driven by means of a chain 122 that passes over a second sprocket 123 that may be driven from the motor 117 or other power source. One manner of driving the sprocket 123 consists in fixedly mounting said sprocket upon the shaft which carries the driving pinion for the drum 116. The pressure indicating means consists of the usual gauge 24, fluid pressure line 34 leading to the device 23, and the arrangement of reservoirs 77 and check valve 78 to replenish the system in the event of fluid leakage therefrom.

In the operation of the device as shown in Fig. 7, the drum ordinarily is filled with premixed concrete to substantially the elevation indicated by the broken line 124, and during the agitating movement of the drum 116 the gauge may be observed for determining the consistency or stiffness of the mix just prior to the pouring or discharging operation. Like the device of Fig. 6, the device of Fig. 7 may be equipped with a clutch means for rendering the indicating device inoperative, if desired. The door 125 which closes an opening in the wall of the drum, is adapted for removal when it is desired to charge or discharge the drum. The provision of such a door is common practice wherefore its structure need not be described in detail. The character 126 indicates any suitable brace for the shaft of blades 120.

Figure 9:
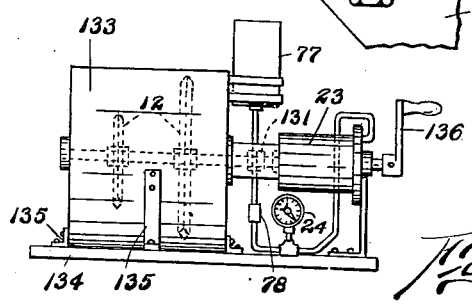
Fig. 9 is a side elevational view of a portable hand operated device which is very similar to that of Fig. 1, and which may be used on the job or in the laboratory with equal facility.

In Fig. 9 is shown a hand operated testing device which is somewhat similar to that of Fig. 1, and which includes a stationary receptacle 133 for plastic substance. The receptacle may be mounted upon any suitable support or upon a base 134, and secured thereto by means of any suitable means, such as brackets 135. The device includes the usual mechanism 23, blades 12, the gauge 24 and its associated fluid conveying tubing which connects the gauge in the proper relationship with the reservoir, check-valve, and the bellows or yielding receptacle of the mechanism 23, as hereinbefore explained. In this modification, the driving sprocket 26 is replaced by the crank 136, whereby rotation is imparted to the blades through the flexible coupling 131. The top of receptacle 133 may or may not be provided with a cover, as desired. The device of Fig. 9 is particularly adapted for use on the job, to check the consistency of delivered batches, but it need not be restricted to such use.

It is to be understood, in conclusion, that various modifications and changes in structural details of the device may be made, within the scope of the appended claims, without departing from the spirit of the invention.

What is claimed is:

1. In a mixing device for plastic semi-solid substance, the combination of a moving drum having walls and an opening therein for entry of plastic forming substance, agitating means in the drum, a receptacle fixed relative to an interior face of one of the drum walls said receptacle having an opening for receiving a quantity of plastic as the receptacle moves therethrough, the receptacle serving to periodically isolate a portion of the mass upon predetermined movement of the drum and to return said isolated portion to the mass, a rotatable shaft extending through one of the drum walls and into the receptacle, a shearing element carried by the shaft, means for rotating the shaft and moving the shearing element through the isolated mass, and means for indicating the shearing resistance offered by the isolated mass to the movement of the shearing element.

2. In a mixing device for plastic semi-solid substance, the combination of a moving drum having walls and an opening therein for entry of plastic forming substance, agitating means in the drum, a receptacle fixed relative to an interior face of one of the drum walls said receptacle having an opening for receiving a quantity of plastic as the receptacle moves therethrough, the receptacle serving to periodically isolate a portion of the mass upon predetermined movement of the drum and to return said isolated portion to the mass, a rotatable shaft extending through one of the drum walls and into the receptacle, a shearing element carried by the shaft, means including a stationary wheel, a second wheel fixed on the rotatable shaft and a power transmission means between the wheels, for rotating the shaft and moving the shearing element through the isolated mass, and means for indicating the shearing resistance offered by the isolated mass to the movement of the shearing element.

3. In an apparatus for determining the wetness or stiffness of a plastic semi-solid substance, the combination of a rotating drum mounted for rotation about a substantially horizontal axis and adapted to contain a quantity of the plastic substance, a receptacle located within the drum and adapted to periodically pick up and discharge a portion of the substance in the drum, a shearing member in the receptacle and having movement relative to the receptacle for imposing a shearing force upon the temporarily isolated mass in the receptacle, and means for indicating the resistance said isolated mass offers to the shearing force of the shearing member thereon.

4. In an apparatus for determining the wetness or stiffness of a plastic semi-solid substance, the combination of a receptacle including means to agitate the plastic substance contained therein and to isolate different portions of said substance during the agitating action, whereby said portions may be rendered substantially free from the agitating influence of the receptacle, a member arranged for movement through the successively isolated portions of the plastic mass, and means for indicating the resistance offered by the isolated portions of the mass to the movement of said element therethrough.

5. In an apparatus for determining the wetness or stiffness of a plastic semi-solid substance, the combination of a rotating receptacle adapted to contain the plastic substance and having a region therein in which a portion of the plastic substance is substantially static, relative to the remaining portion, a power driven element adapted for positive rotational movement through that portion of the substance which is substantially static said element including blades having advancing faces which are sufficiently limited in area to substantially preclude agitating of the substantially static portion of the mass, and means for indicating the resistance offered to movement of said element through the substantially static portion of the mass.

6. In an apparatus for determining the wetness or stiffness of plastic concrete or other cement-containing mixes, the combination of a receptacle for the plastic mass, means movable with the receptacle for periodically isolating a portion of the mix contained in the receptacle, a power driven member associated with the isolating means to shear the plastic mass held within the isolating means, and means for indicating the resistance the mass offers to the shearing force of the shearing member upon the isolated mass.

7. In an apparatus for determining the wetness or stiffness of plastic concrete or other cement-containing mixes, the combination of a receptacle for the plastic mass, means associated with the receptacle for periodically isolating a portion of the mix contained in the receptacle, a member associated with the isolating means to shear the isolated portions of the plastic mass, means for imparting relative movement to the isolating means and the shearing member, and means for indicating the resistance the mass offers to the shearing force of the shearing member upon said isolated portions of the mass.

8. In an apparatus for control of the ultimate strength of concrete, the combination of a receptacle for the plastic mass, a power rotated member having a shearing action rather than an agitating action, and substantially submerged in the plastic mass and adapted to shear the mass as said member is driven therethrough, means for indicating the resistance the mass offers to the shearing force of the shearing member upon the mass and means for intermittently adding water to the mass within the receptacle during application of power to the said power operated member, to vary the wetness or stiffness of the mass.

9. In a concrete mixer, the combination of a rotating receptacle for the plastic mass, a rotating power operated member mounted for bodily movement with the receptacle while rotating, and substantially submerged in the plastic mass and adapted to shear rather than agitate a small portion of the mass as said member is driven therethrough, and means for indicating the resistance the mass offers to the shearing force of the shearing member upon the mass as a determinant of the duration of mixing of the mass.

10. In an apparatus for determining the wetness or stiffness of a plastic semi-solid substance, the combination of a receptacle including means to agitate the plastic substance contained therein and means to isolate different portions of said substance during the agitating action, whereby said portions may be rendered substantially static and free from the agitating influence of the receptacle, a member substantially submerged in and arranged for movement through the isolated portions of the plastic mass, and means for indicating the resistance offered by the isolated mass to the movement of said member therethrough.

11. Apparatus for determining the wetness or stiffness of plastic concrete or other cement-containing mixes, comprising in combination a receptacle for the mix, means for rotating the receptacle to preclude segregation of the aggregate, said receptacle having a relatively smooth interior to minimize agitation of the mix and to allow the mix to slip along the receptacle interior by gravity as the receptacle rotates, thereby providing a substantially static mass in the receptacle, a power operated member having an advancing face of small area such as to insure a practically negligible agitating action, supported for movement through the substantially static mass to shear rather than agitate the mass as said member is driven therethrough, and means for indicating the resistance the mass offers to the shearing force of the shearing member upon the mass.

12. Apparatus for determining the wetness or stiffness of a plastic semi-solid substance, comprising in combination a receptacle for the mix, means for rotating the receptacle to preclude separation of the ingredients of the substance, said receptacle having a relatively smooth interior to minimize agitation of said plastic substance and to allow the substance to slip along the receptacle interior by gravity to a low region as the receptacle rotates, thereby providing a substantially static mass in the receptacle, a power operated rotating member of a small size such as to have a practically negligible agitating function, means for supporting said member in a substantially immersed position for rotation through the substantially static mass to shear the mass as the member is rotated in a small portion of the mass, and means for indicating the resistance the mass offers to the shearing force of the driven member.

13. In an apparatus for determining the wetness or stiffness of a plastic semi-solid substance, the combination of a rotating drum mounted for rotation about a substantially horizontal axis and adapted to contain a quantity of the plastic substance, a receptacle located within the drum and adapted to periodically pick up and discharge a portion of the substance in the drum, a shearing member in the receptacle and having movement relative to the receptacle for imposing a shearing force upon the temporarily isolated mass in the receptacle, means for indicating the resistance said isolated means offers to the shearing force of the shearing member thereon, and means including a stationary wheel, a second wheel movable with the shearing member, and a power transmission means connecting the wheels, for rotating the shearing element through the temporarily isolated mass in the receptacle as the drum rotates.

14. A control apparatus for concrete, comprising in combination a rotating mixing drum for concrete in the plastic state, a power driven shearing member arranged both for movement through the concrete held in the drum, and for bodily movement about the drum axis, and means for indicating the resistance the mass offers to the shearing force of the shearing member upon the mass, as a determinant of relative plasticity and workability of the concrete.

15. A strength control apparatus for concrete, comprising in combination, a rotating concrete mixer drum in which concrete in a plastic state is retained to preclude segregation, a power actuated shearing member arranged to be driven through the retained concrete while the drum is rotating, and means for indicating the shearing force of the shearing member upon said concrete, as a determinant in calculating the approximate strength the concrete will have after setting.

16. A strength control apparatus for concrete, comprising in combination, a moving receptacle in which concrete in a fluid state is retained to preclude segregation, a power actuated shearing member arranged to be driven through the retained concrete while the receptacle is moving, means for indicating the shearing force of the shearing member upon said concrete, as a determinant in calculating the approximate strength the concrete will have after setting, and means for adding an ingredient to the fluid concrete to vary the indication of the shearing force.

17. A concrete mixer comprising in combination, a rotating receptacle for mixing concrete in the plastic state, a rotating power-actuated member mounted upon and movable bodily with the receptacle and adapted to shear the concrete as said member is driven therethrough, and means for indicating the shearing force of the shearing member upon the concrete, as a determinant of relative plasticity of concrete batches mixed in the receptacle.

18. A concrete mixer comprising in combination, a rotating receptacle including substantially fixed blades for mixing concrete in the plastic state, a rotating power-actuated member in the receptacle located remotely of blade interference and adapted to shear the concrete as said member is driven therethrough, during the mixing period of the moving receptacle and means for indicating the shearing force of the shearing member upon the concrete, as a determinant of relative workability of successive concrete batches mixed in the receptacle.

19. A machine for controlling the ultimate strength of concrete, comprising in combination a receptacle for the concrete in a fluid state, means for precluding segregation of the ingredients thereof without severe agitation, whereby the fluid concrete remains substantially static within the receptacle, a power operated shearing member of such character as to have a practically negligible agitating function, means supporting said shearing member for movement through the substantially static concrete of the receptacle, to shear the concrete as the shearing member moves through a small portion of the mass, and means indicating the shearing force, comprising a closed housing secured upon the receptacle and providing a variable chamber for fluid, means associated with the shearing member for varying the capacity of said chamber, a tube connected with said chamber to convey fluid to a location outside of the receptacle, and a gauge acted upon by fluid conveyed by the tube to and from the chamber, for indicating variations in fluid pressure within the chamber.

20. A machine for controlling the ultimate strength of concrete, comprising in combination a mixing drum for the concrete in a plastic state, a power operated shearing member of such character as to have a practically negligible agitating function, means supporting said shearing member for movement through the concrete in the drum to shear the concrete as the shearing member moves through a portion of the mass, and means indicating the shearing force, comprising a closed housing fixed relative to the drum and providing a variable chamber for fluid, means associated with the shearing member for varying the capacity of said chamber, a tube connected with said chamber to convey fluid to a location outside of the drum, and a gauge acted upon by fluid conveyed by the tube to and from the chamber, for indicating variations in fluid pressure within the chamber resulting from varying resistance to the shearing member movement.

21. A machine for duplicating the workability and plasticity of successive batches of concrete, comprising in combination a rotating receptacle for the concrete in a plastic state, a power operated shearing member of such character as to have a practically negligible agitating function, means supporting said shearing member for movement through the concrete in the drum to shear the concrete as the shearing member moves through a portion of the mass, and means indicating the shearing force, comprising a closed housing fixed relative to the drum and providing a variable chamber for fluid, means associated with the shearing member for varying the capacity of said chamber, a tube connected with said chamber to convey fluid to a location outside of the drum, and a gauge acted upon by fluid conveyed by the tube to and from the chamber, for indicating variations in fluid pressure within the chamber resulting from varying resistance to the shearing member movement.

ERNEST A. HAGY.